US008371279B2

(12) United States Patent
Doers

(10) Patent No.: US 8,371,279 B2
(45) Date of Patent: Feb. 12, 2013

(54) CRANKCASE PRESSURE REGULATOR FOR AN INTERNAL COMBUSTION ENGINE

(75) Inventor: Douglas A. Doers, Franklin, WI (US)

(73) Assignee: Deltahawk Engines, Inc., Racine, WI (US)

( * ) Notice: Subject to any disclaimer, the term of this patent is extended or adjusted under 35 U.S.C. 154(b) by 805 days.

(21) Appl. No.: 12/570,596

(22) Filed: Sep. 30, 2009

(65) Prior Publication Data

US 2010/0077972 A1    Apr. 1, 2010

Related U.S. Application Data

(60) Provisional application No. 61/101,278, filed on Sep. 30, 2008.

(51) Int. Cl.
*F01M 13/00* (2006.01)
*F02B 25/06* (2006.01)
(52) U.S. Cl. ............... 123/572; 123/574; 123/41.86
(58) Field of Classification Search ......... 123/572–574, 123/41.86
See application file for complete search history.

(56) References Cited

U.S. PATENT DOCUMENTS

| 3,241,537 A | 3/1966 | Jones |
| 3,589,347 A | 6/1971 | Sawada |
| 3,673,997 A | 7/1972 | Sawada |
| 4,210,113 A | 7/1980 | Heffernan |
| 4,249,389 A * | 2/1981 | Mayer ............... 62/192 |
| 4,257,383 A | 3/1981 | Boswell |
| 4,549,520 A | 10/1985 | Tamba et al. |
| 4,606,321 A | 8/1986 | Gallegos del Bosque |
| 4,715,351 A | 12/1987 | Pankow |
| 4,760,833 A | 8/1988 | Tatyrek |
| 4,852,539 A * | 8/1989 | Pankow ............... 123/587 |
| 4,922,881 A | 5/1990 | Tamba et al. |
| 5,228,424 A | 7/1993 | Collins |
| 5,499,616 A | 3/1996 | Enright |
| 5,564,401 A | 10/1996 | Dickson |
| 5,586,541 A | 12/1996 | Tsai |
| 5,839,413 A * | 11/1998 | Krause et al. ............... 123/447 |
| 5,964,207 A | 10/1999 | Clauss et al. |

(Continued)

FOREIGN PATENT DOCUMENTS

| DE | 102006048929 A1 | 4/2008 |
| JP | 07063036 | 3/1995 |

(Continued)

OTHER PUBLICATIONS

PCT/US2009/058986 International Search Report and Written Opinion dated Jan. 22, 2010 (13 pages).

*Primary Examiner* — Nathaniel Wiehe
*Assistant Examiner* — Tea Holbrook
(74) *Attorney, Agent, or Firm* — Michael Best & Friedrich LLP

(57) ABSTRACT

An internal combustion engine that includes a crankcase having a crankcase pressure defined within the crankcase relative to an ambient pressure. The crankcase pressure varies in response to operation of the internal combustion engine. A crankcase pressure regulator is in fluid communication with the crankcase, and the crankcase pressure regulator includes a first passageway defining a first flow path, a second passageway defining a second flow path in a parallel arrangement to the first passageway. When the crankcase pressure is less than a first predetermined pressure, the first valve moves to the open position to allow a fluid flow into the crankcase through the first passageway. When the crankcase pressure is greater than a second predetermined pressure, the second valve moves from the closed position to the open position to allow a fluid flow from the crankcase through the second passageway.

17 Claims, 5 Drawing Sheets

U.S. PATENT DOCUMENTS

| | | | |
|---|---|---|---|
| 6,109,886 A | 8/2000 | Schonfeld et al. | |
| 6,418,918 B2 | 7/2002 | Mammarella | |
| 6,505,615 B2 | 1/2003 | Pietschner | |
| 6,606,982 B1 | 8/2003 | Stockhausen et al. | |
| 6,651,636 B1 | 11/2003 | Albright | |
| 7,017,546 B1 | 3/2006 | Patel et al. | |
| 7,025,049 B2 | 4/2006 | Pietschner | |
| 7,100,587 B2 | 9/2006 | Ahlborn et al. | |
| 7,275,527 B2 | 10/2007 | Bruchner et al. | |
| 7,310,945 B2 | 12/2007 | Gurski et al. | |
| 2001/0024914 A1* | 9/2001 | Suganuma et al. | 440/88 |
| 2001/0027890 A1* | 10/2001 | Bria et al. | 180/291 |
| 2003/0017766 A1 | 1/2003 | Gokan et al. | |
| 2008/0257321 A1 | 10/2008 | Knaus et al. | |
| 2009/0126805 A1 | 5/2009 | Olshanetsky et al. | |

FOREIGN PATENT DOCUMENTS

| | | |
|---|---|---|
| JP | 11200830 A | 7/1999 |
| WO | 9961761 A1 | 12/1999 |

* cited by examiner

CRANKCASE PRESSURE REGULATOR FOR AN INTERNAL COMBUSTION ENGINE

CROSS-REFERENCE TO RELATED APPLICATIONS

This application claims priority to U.S. Provisional Application No. 61/101,278, filed Sep. 30, 2008, the entire contents of which are hereby incorporated by reference.

BACKGROUND

The present invention relates to internal combustion engines, and more particularly, to regulating the pressure within crankcases of internal combustion engines.

Controlling oil consumption in a ported two-stroke diesel engine is often difficult. First, openings in cylinder walls of the engine for exhaust discharge and air intake provide paths where oil can be introduced into the exhaust discharge or the intake plenum. Accordingly, oil can be burned and consumed as the oil-contaminated intake air is drawn into the cylinders or oil can be released as unburned hydrocarbons with the exhaust. Piston ring packs are designed to minimize such oil consumption.

For example, in one design, oil control piston rings do not cross either the intake or exhaust ports while the compression rings do cross the intake and exhaust ports. This design separates the oil control and compression rings on the piston such that there is a large piston skirt area that has limited lubrication during engine operation. Accordingly, engine designers must balance the design of the oil control rings to allow sufficient oil on the piston skirt and compression rings to properly lubricate these areas and yet minimize oil in these areas to control oil consumption and reduce the emission of unburned hydrocarbons.

Proper design of the oil control rings to provide the correct amount of oil is difficult due to the dynamic nature of the pressure in the engine manifold and crankcase. During high power operation of the engine the crankcase pressure is typically lower than the intake manifold pressure, which forces oil toward the crankcase. If the oil control rings are too aggressive in removing oil the compression rings and piston skirt can become too dry (oil starved) and fail. During engine idle and low power operation, the crankcase pressure is often higher than the intake pressure, forcing oil toward the combustion chamber and exhaust and intake ports.

SUMMARY

In one embodiment, the invention provides an internal combustion engine that includes a crankcase having a crankcase pressure defined within the crankcase relative to an ambient pressure. The crankcase pressure varies in response to operation of the internal combustion engine. The engine further includes an oil sump pump in fluid communication with the crankcase, and the oil sump pump is operable to remove oil and air from the crankcase to reduce the crankcase pressure. A crankcase pressure regulator is in fluid communication with the crankcase, and the crankcase pressure regulator includes a first passageway defining a first flow path, a second passageway defining a second flow path in a parallel arrangement to the first passageway, and a first valve located within the first passageway and movable from an open position to a closed position. The first valve includes a biasing member that biases the first valve toward the closed position. A second valve is located within the second passageway and is movable from an open position to a closed position, and the second valve includes a biasing member that biases the second valve toward the closed position. When the crankcase pressure is less than a first predetermined pressure, the first valve moves from the closed position to the open position to allow a fluid flow into the crankcase through the first passageway while the second valve remains in the closed position to inhibit fluid flow through the second passageway. When the crankcase pressure is greater than a second predetermined pressure, the second valve moves from the closed position to the open position to allow a fluid flow from the crankcase through the second passageway while the first valve remains in the closed position to inhibit fluid flow through the first passageway. The second predetermined pressure is greater than the first predetermined pressure.

In another embodiment, the invention provides a two-stroke diesel engine that includes a crankcase having a crankcase pressure defined as a pressure within the crankcase relative to an ambient pressure, and the crankcase pressure varies in response to operation of the engine. The engine further includes a crankcase pressure regulator in fluid communication with the crankcase, and the crankcase pressure regulator includes a first valve movable from an open position to a closed position, and a second valve movable from an open position to a closed position. When the crankcase pressure is less than a first predetermined pressure, the first valve is held in the open position by the ambient pressure to allow a fluid flow into the crankcase to increase the crankcase pressure while the second valve is held in the closed position. When the crankcase pressure is greater than a second predetermined pressure, the second valve is held in the open position by the crankcase pressure to allow a fluid flow out of the crankcase to reduce the crankcase pressure while the first valve is held in the closed position. The second predetermined pressure is greater than the first predetermined pressure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
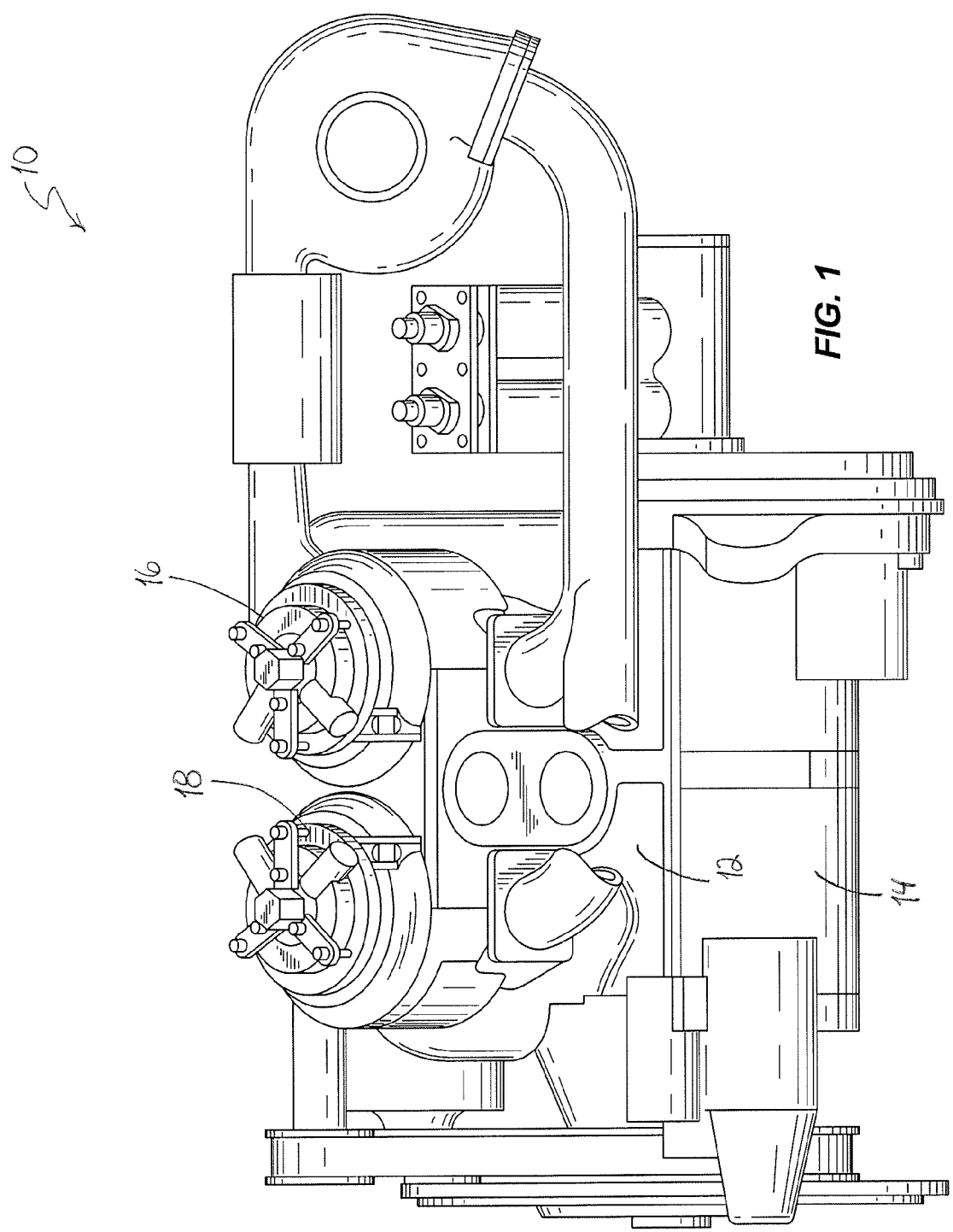
FIG. 1 is an elevational view of an internal combustion engine in which the present invention is employed.
Figure 5:
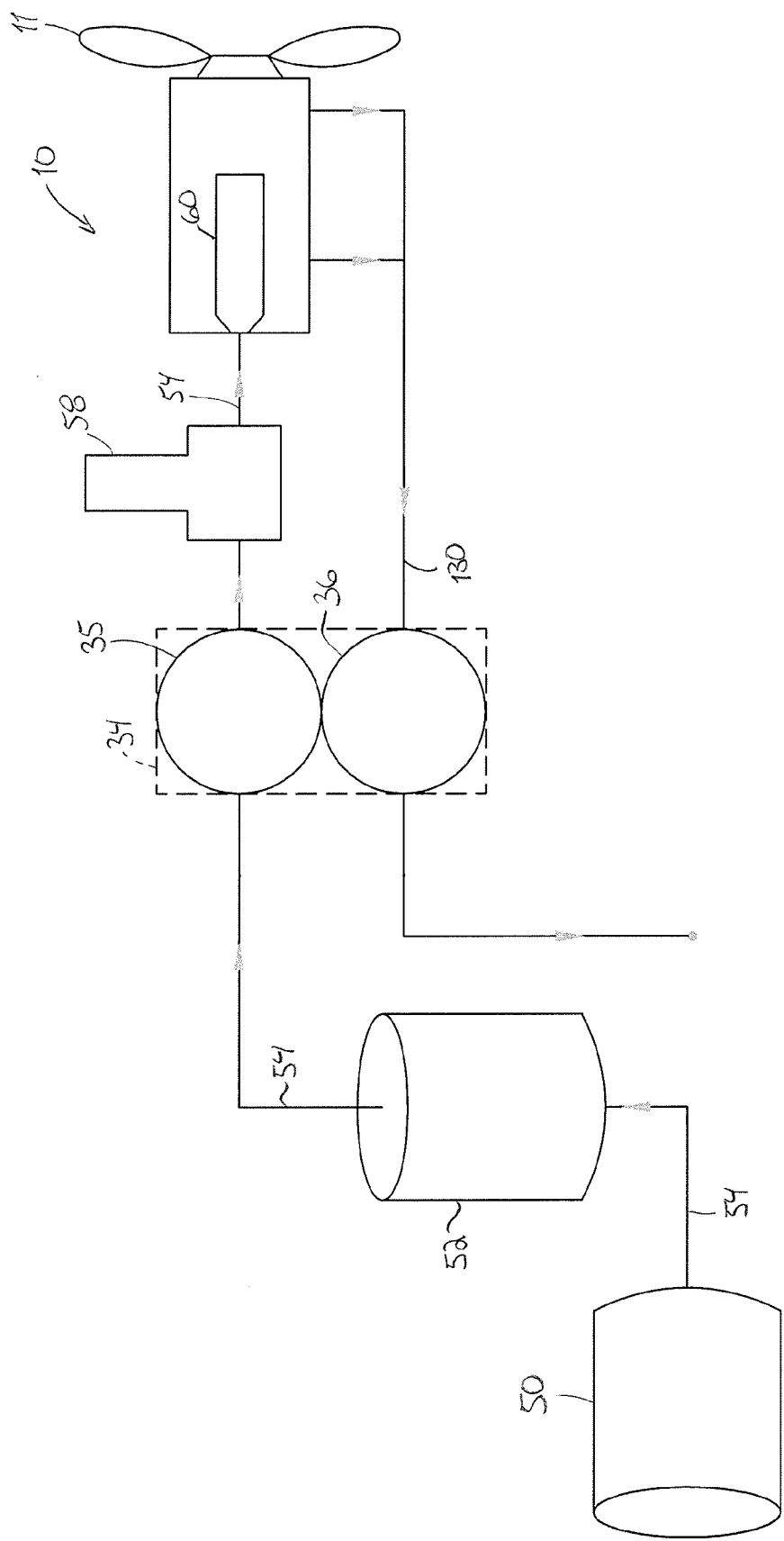
FIG. 5 is an air flow diagram of the engine of FIG. 1.

Illustrated in FIG. 1 is an internal combustion engine 10 in which the present invention is employed. It should be understood that the present invention is capable of use in other engines, and the engine 10 is merely shown and described as an example of one such engine. The engine 10 is a two-stroke, diesel aircraft engine operable to drive a propeller 11 (FIG. 5). More particularly, the engine 10 is a V-type engine with four ported cylinders. The improvements described herein are particularly well suited for use in such engines, but may be used in other internal combustion engines.

Figure 4:
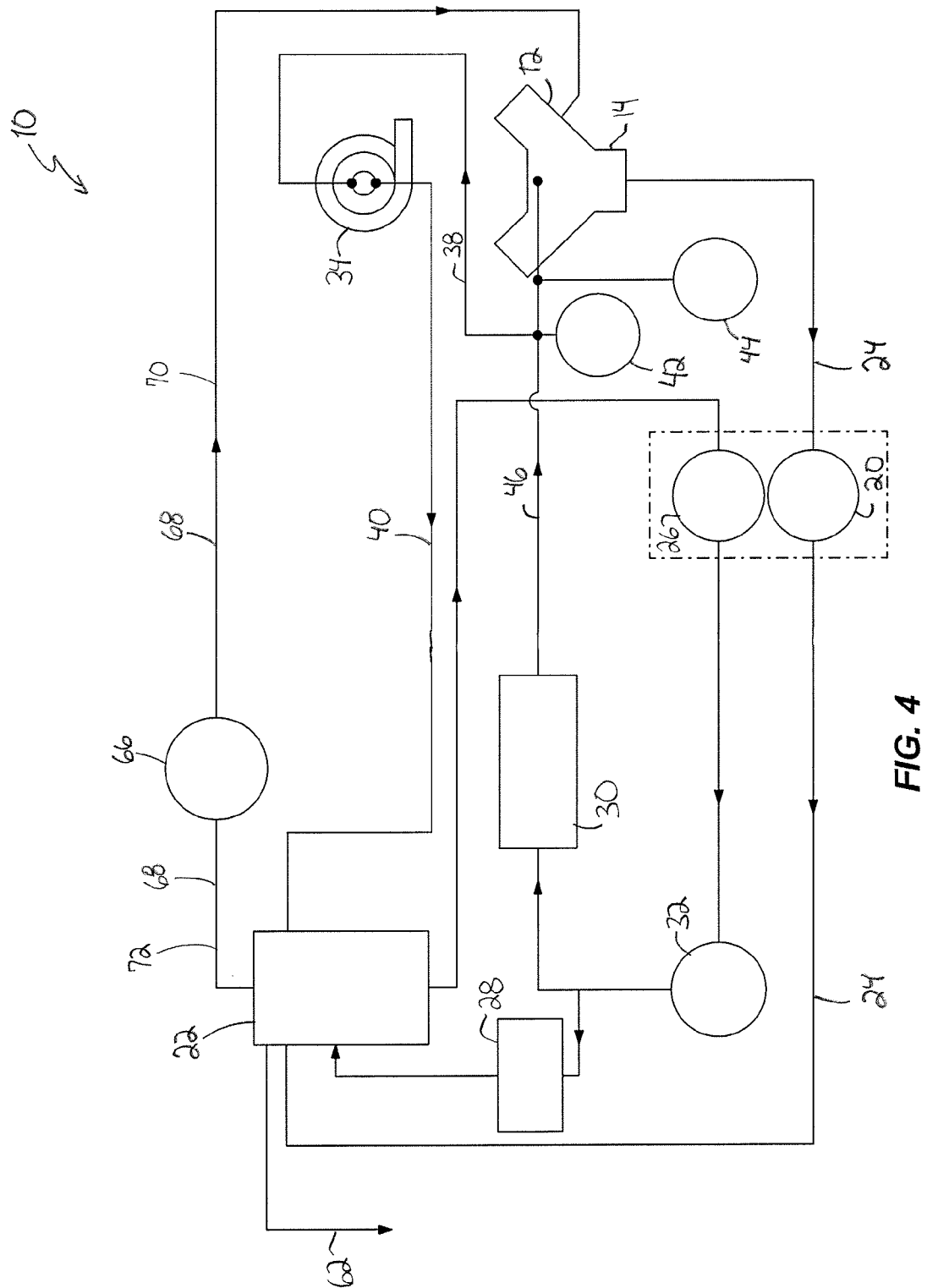
FIG. 4 is an oil flow diagram of the engine of FIG. 1.

With continued reference to FIG. 1, the illustrated engine 10 further includes an engine block 12 that at least partially defines a crankcase 14 and two banks, each of which includes two cylinders (only two cylinders are visible in FIG. 1 and have reference numerals 16 and 18). The illustrated engine 10 is a dry sump engine that includes an oil sump pump or scavenge pump 20 (illustrated schematically in FIG. 4) to remove oil and air from within the crankcase 14. Referring to FIGS. 1 and 4, the engine 10 also includes an oil tank 22 and a scavenge discharge line 24 that provides fluid communication between the crankcase 14, the scavenge pump 20, and the oil tank 22.

Referring to FIG. 4, the engine 10 further includes a supply oil pump 26, an oil pressure regulator 28, and an oil cooler or heat exchanger 30. The oil supply pump 26 supplies oil to the engine block 12 and crankcase 14 from the oil tank 22 during operation of the engine 10. The oil pressure regulator 28 bleeds or allows a portion of oil to travel back to the oil tank 22 if the discharge pressure of the supply pump 26 exceeds a predetermined value. For example, in one construction, the oil pressure regulator 28 is set such that the oil pressure within the heat exchanger 30 does not exceed about 150 psi. An oil filter 32 is disposed between the oil tank 22 and the engine block 12 to filter oil supplied to the engine block 12 from the tank 22.

Referring to FIGS. 4 and 5, the engine 10 further includes a turbo-charger 34 having a compressor 35 and a turbine 36 that drives the compressor 35 using exhaust gas from the engine 10. An oil supply line 38 (FIG. 4) fluidly couples the turbo-charger 34 and the oil tank 22 to supply oil to the turbo-charger 34. An oil return line 40 fluidly couples the turbo-charger 34 and the oil tank 22 to return oil from the turbo charger 34 back to the oil tank 22. A pressure sensor 42 and a temperature sensor 44 are in fluid communication with a main oil supply line 46 to sense the pressure and temperature, respectively, of oil being supplied to the engine block 12, the crankcase 14, and the turbo-charger 34.

Referring to FIG. 5, an air inlet 50 and an air filter 52 are arranged in series in an air inlet line 54 of the engine 10. The illustrated engine 10 further includes an intercooler 58 and a supercharger 60. Referring to FIGS. 4 and 5, an air vent line 62 fluidly couples the oil tank 22 with the air inlet 50 to vent the oil tank 22 to the air inlet line 54.

Figure 2:
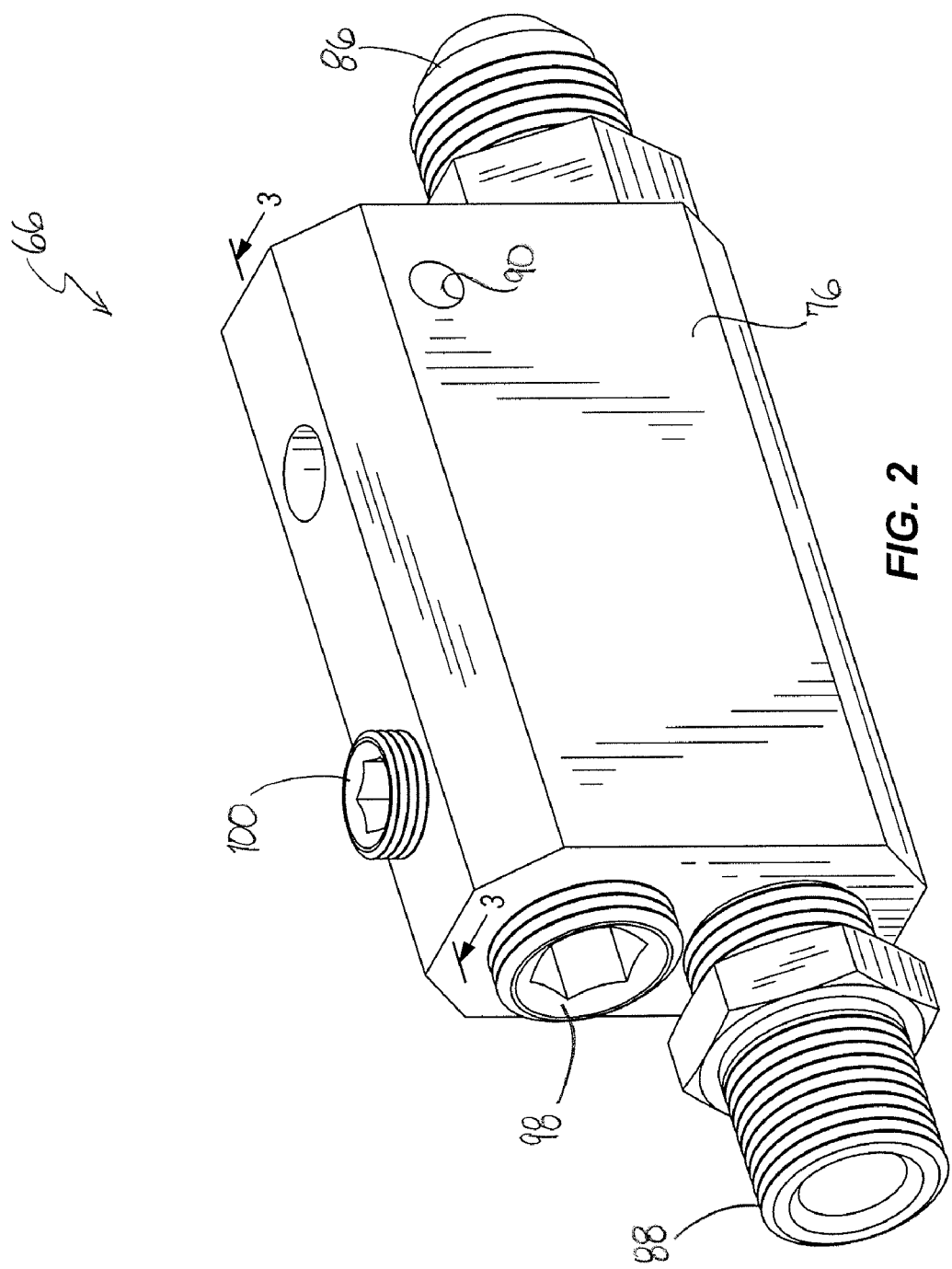
FIG. 2 is a perspective view of a crankcase pressure regulator of the engine of FIG. 1.
Figure 3:
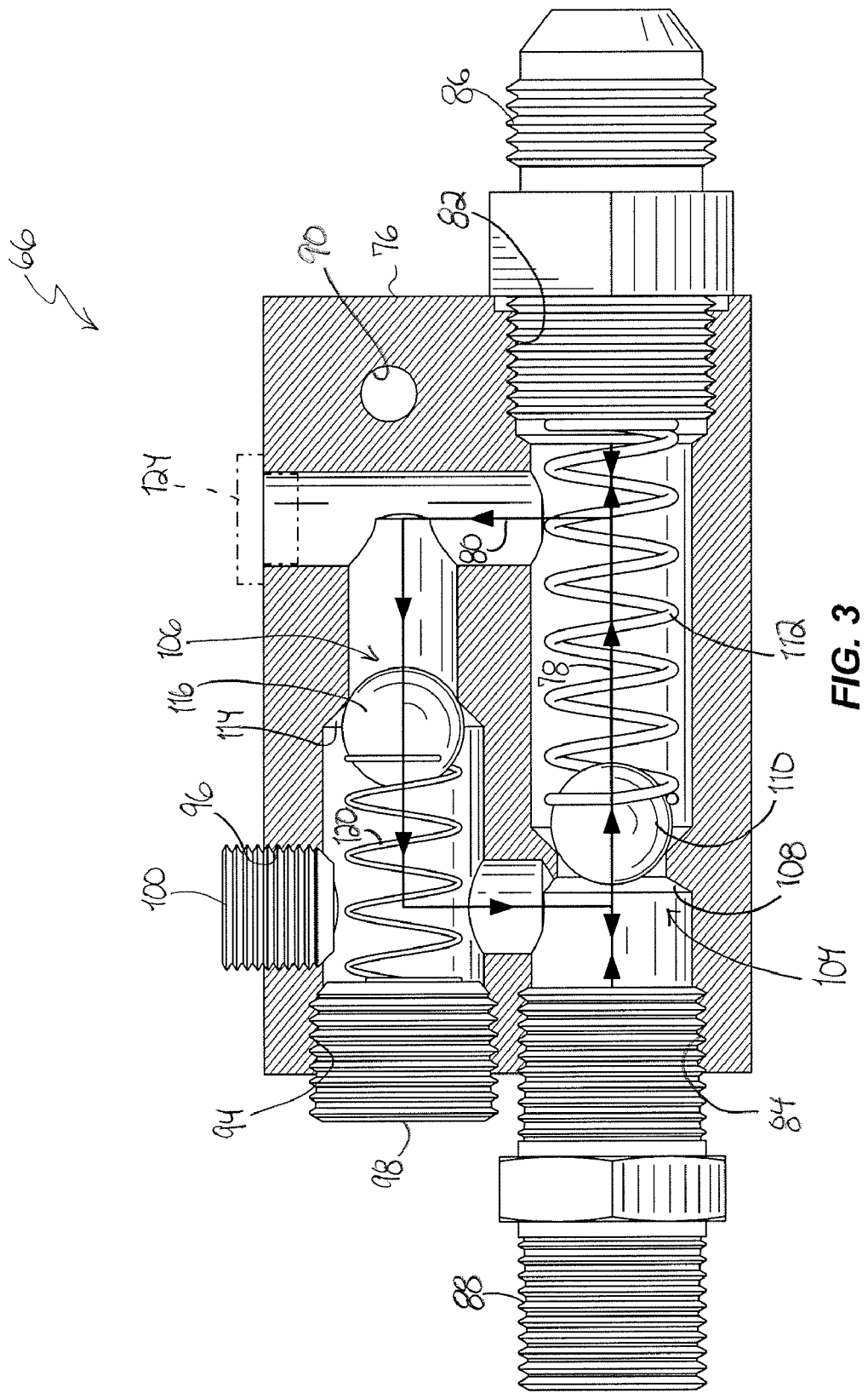
FIG. 3 is a partial cross-sectional side view of the crankcase pressure regulator of FIG. 2 taken along line 3-3 of FIG. 2.

Referring to FIG. 4, the engine 10 further includes a crankcase pressure regulator 66 that is in fluid communication with the oil tank 22 and the crankcase 14 via a crankcase breather line 68. The crankcase breather line 68 includes a first portion 70 that extends between the crankcase pressure regulator 66 and the crankcase 14 to provide fluid communication between the crankcase 14 and the crankcase pressure regulator 66. A second portion 72 of the breather line 68 extends between the pressure regulator 66 and the oil tank 22 to provide fluid communication between the pressure regulator 66 and the oil tank 22. Referring to FIGS. 2 and 3, the crankcase pressure regulator 66 includes a body 76. In the illustrated construction, the body 76 is formed to define a first internal passageway 78 and a second internal passageway 80 that both extend through the body 76 of the pressure regulator 66.

The body 76 further includes a first aperture 82 and a second aperture 84. The first passageway 78 is defined as a flow path through the first aperture 82 and the second aperture 84. As illustrated in FIG. 3, the second passageway 80 is defined as a flow path through the first aperture 82 and the second aperture 84 such that the second passageway 80 is in a parallel arrangement to the first passageway 78. A first connector 86 is partially located within the first aperture 82 in order to fluidly couple the first aperture 82 with the crankcase 14 of the engine 10 via the first portion 70 of the breather line 68. A second connector 88 is partially located within the second aperture 84 to fluidly couple the second aperture 84 with the oil tank 22 via the second portion 72 of the breather line 68. While the illustrated first and second connectors 86 and 88, respectively, are threaded nipples or bushings, in other constructions, any suitable connector can be utilized.

Furthermore, while FIG. 4 schematically illustrates the crankcase pressure regulator 66 connected to the crankcase breather line 68 at both the connectors 86 and 88, the connectors 86 and 88 can be utilized to directly couple the pressure regulator 66 to either the crankcase 14 or the oil tank 22. For example, in one construction the pressure regulator 66 can be mounted on the oil tank 22 using an aperture 90 of the body 76 and the second connector 88 can be connected to the oil tank 22. Of course, in other constructions, other suitable arrangements of the pressure regulator 66 within the flow path of the crankcase 14, crankcase breather line 68, and the oil tank 22 can be utilized.

The body 76 of the pressure regulator 66 further includes a first auxiliary aperture 94 and a second auxiliary aperture 96. The first and second auxiliary apertures 94 and 96 are utilized while manufacturing the pressure regulator 66 to access the passageways 78 and 80 and other components within the pressure regulator 66 that will be discussed herein as would be readily apparent to one of skill in the art. In the illustrated construction, threaded plugs 98 and 100 are utilized to block or close the apertures 94 and 96, respectively, after the requisite manufacturing and assembling processes are completed within the body 76.

The pressure regulator 66 further includes a first check valve 104 and a second check valve 106. The first check valve 104 includes a seat 108, which in the illustrated construction is integrally formed in the body 76. The first check valve 104 further includes a valve member 110, which is a ball in the illustrated construction, and a biasing member 112, which is a coil spring in the illustrated construction. As best seen in FIG. 3, the spring 112 contacts the first connector 86 to bias the ball 110 against the seat 108 or into a closed position of the valve 104. As will be discussed in more detail below, the first check valve 104 regulates flow through the first passageway 78, and the first check valve 104 is arranged to allow fluid flow through the first passageway 78 in the direction of the arrows of FIG. 3 along the first passageway 78 while preventing fluid flow in the opposite direction.

The second check valve 106 includes a seat 114, which in the illustrated construction is integrally formed in the body 76. The second check valve 106 further includes a valve member 116, which is a ball in the illustrated construction, and a biasing member 120, which is a coil spring in the illustrated construction. The spring 120 of the second check valve 106 contacts the threaded plug 98 of the first auxiliary aperture 94 such that the ball 116 is biased against the seat 114 or into a closed position of the valve 106. As will be discussed in more detail below, the second check valve 106 regulates flow through the second passageway 80, and the second check valve 106 is arranged to allow fluid flow through the second passageway 80 in the direction of the arrows of FIG. 3 along the second passageway 80 while preventing fluid flow in the opposite direction. While the check valves 104 and 106 in the illustrated construction are ball-type check valves, it should be understood that other types of valves and check valves can be utilized.

Referring to FIG. 3, in the illustrated construction, the crankcase pressure regulator 66 includes a pressure sensor 124 (illustrated schematically in FIG. 3). The pressure sensor 124 is in fluid communication with the first and second passageways 78 and 80, respectively, such that pressure sensor 124 is operable to measure the pressure within the crankcase 14 regardless of the position (i.e., open or closed) of the first and second check valves 104 and 106, respectively.

Referring to FIG. 5, during operation of the engine 10, which is a two-cycle diesel engine in the illustrated construction, ambient air for combustion is drawn through the air inlet 50, then through the air filter 52 by the compressor 35 of the turbo-charger 34. The compressor 35 is driven by the turbine 36 to compress the combustion air. The turbine 36 is driven by exhaust gases from the engine 10 that are delivered to the turbine 36 by an exhaust line 130. The compressed combustion air then travels through the intercooler 58 and supercharger 60 before entering the combustion chamber of the engine 10. Meanwhile, referring to FIG. 4, the scavenge pump 20 removes air and oil from within the crankcase 14 through the scavenge discharge line 24, which generally reduces the pressure within the crankcase 14 below the ambient pressure. The air and oil removed by the scavenge pump 20 can include air and oil from the combustion chamber that bypasses the piston rings.

Referring to FIGS. 3 and 4, the first check valve 104, which is biased into the closed position, inhibits make-up air from entering the crankcase 14 through the crankcase breather line 68 until the pressure within the crankcase 14 reaches a predetermined average lower level. Thus, the average pressure within the crankcase 14 is reduced and maintained below ambient pressure, particularly during low power operation of the engine 10. The first check valve 104 remains closed until the average crankcase pressure is the less than the predetermined average lower level. When the crankcase pressure is less than the predetermined lower level, the pressure within the oil tank 22 (about ambient pressure) acting against the ball 110 overcomes the force of the spring 112 to lift the ball 110 from the seat 108 to open the first valve 104 to allow make-up air to flow into the crankcase 14 in order to maintain the air pressure within the crankcase 14 above the predetermined average lower level.

As would be understood by one of skill in the art, a pressure wave is created in the crankcase 14 by the pistons being alternatively drawn into the crankcase 14 and the pistons being pushed into the cylinders during the normal compression and combustion strokes of the engine 10. In one construction of the engine 10, this pressure wave is about +/−4 psi. In such a construction, the spring 112 of the first check valve 104 can be chosen such that the first check valve 104 opens when the average pressure within the crankcase 14 is about −6 psi. Alternatively stated, the first check valve 104 opens to allow make-up air to pass through the first passageway 78 when the pressure within the crankcase 14 is 6 psi less than the pressure within the oil tank 22, which is about ambient pressure. Therefore, if the pressure wave is about +/−4 psi, the instantaneous pressure within the crankcase 14 will oscillate between about −10 psi and −2 psi and the peak of the pressure wave does not exceed ambient pressure (e.g., 0 psi). In the illustrated construction, the make-up air is drawn from the oil tank 22 through the breather line 68. While in the construction of the pressure regulator 66 discussed above, the first check valve 104 opens at −6 psi, in other constructions the first check valve 104 can open at an average pressure greater than or less than −6 psi. For example, the engine seals and/or the amplitude of the pressure wave generated by piston oscillation may make a different opening average pressure for the check valve 104 more desirable.

During operation of the engine 10, particularly during low power operation of the engine 10, the pressure within the intake manifold is relatively low or near atmospheric pressure. Thus, in the construction described above, the instantaneous pressure within the crankcase 14 does not exceed about −2 psi or remains lower than the intake manifold pressure. As a result, the amount of oil that is forced by pressure from the crankcase 14 toward the intake manifold is greatly reduced.

During high power operation of the engine 10, the pressure within the intake manifold can be relatively high. Furthermore, as discussed above, the pressure regulator 66 lowers the average pressure within the crankcase 14. As a result, there can be an excessive amount of air that leaks past the piston rings and into the crankcase 14. While the scavenge pump 20 removes air from the crankcase 14, the leakage may be at such a rate that the pump 20 is unable to remove a sufficient amount of air to maintain a negative (i.e., less than ambient) pressure within the crankcase 14. If the pressure within the crankcase 14 exceeds a predetermined average level, the second check valve 106 opens to allow air to pass through the second passageway 80 and to the oil tank 22 and vent 62 thereby venting the crankcase 14 to the air inlet line 54 (FIG. 5). The second check valve 106 remains closed until the average crankcase pressure is greater than the predetermined level. When the crankcase pressure is greater than the predetermined level, the pressure within the crankcase 14 acting against the ball 116 overcomes the force of the spring 120 to lift the ball 116 from the seat 114 to open the second valve 106.

In one construction, the spring 120 of the second check valve 106 is chosen such that the second check valve 106 opens when the average pressure within the crankcase is about 0.2 psi above ambient pressure. Of course in other constructions, the second check valve 106 can be designed to open at more or less than 0.2 psi.

Accordingly, during operation of the engine 10 the average pressure within crankcase 14 does not exceed the pressure within the intake manifold. Thus, the amount of oil that is forced by air pressure from the crankcase 14 toward the intake manifold is substantially reduced or nearly eliminated. By substantially reducing the amount of oil forced into the intake manifold, the oil control rings are able to better provide proper and consistent amounts of oil to the piston skirt. Also, keeping the pressure within the crankcase 14 relatively low reduces parasitic or windage loss within the crankcase 14 associated with the air pumping that typically occurs from one part of a crankcase to another.

What is claimed is:
1. An internal combustion engine comprising:
a crankcase having a crankcase pressure defined within the crankcase relative to an ambient pressure, the crankcase pressure varying in response to operation of the internal combustion engine;
an oil sump pump in fluid communication with the crankcase, the oil sump pump operable to remove oil and air from the crankcase to reduce the crankcase pressure;
a crankcase pressure regulator in fluid communication with the crankcase, the crankcase pressure regulator including,
a first passageway defining a first flow path, a second passageway defining a second flow path in a parallel arrangement to the first passageway, a first valve located within the first passageway and movable from an open position to a closed position, the first valve including a biasing member that biases the first valve toward the closed position, and a second valve located within the second passageway and movable from an open position to a closed position, the second valve including a biasing member that biases the second valve toward the closed position;

an oil tank;

a scavenge discharge line that provides fluid communication between the crankcase, the oil sump pump, and the oil tank;

an oil supply pump operable to supply oil to the crankcase; and a crankcase breather line including a first portion that extends between the crankcase pressure regulator and the crankcase to provide fluid communication between the crankcase and the crankcase pressure regulator, and a second portion that extends between the crankcase pressure regulator and the oil tank to provide fluid communication between the crankcase pressure regulator and the oil tank, wherein when the crankcase pressure is less than a first predetermined pressure, the first valve moves from the closed position to the open position to allow a fluid flow into the crankcase through the first passageway while the second valve remains in the closed position to inhibit fluid flow through the second passageway, wherein when the crankcase pressure is greater than a second predetermined pressure, the second valve moves from the closed position to the open position to allow a fluid flow from the crankcase through the second passageway while the first valve remains in the closed position to inhibit fluid flow through the first passageway, and wherein the second predetermined pressure is greater than the first predetermined pressure.

2. The internal combustion engine of claim 1, wherein when the crankcase pressure is greater than the first predetermined pressure and less than the second predetermined pressure, both the first valve and the second valve remain in the closed positions to inhibit fluid flow through the first passageway and the second passageway.

3. The internal combustion engine of claim 1, wherein the crankcase pressure regulator further includes, a body portion, a first aperture formed in the body portion, and a second aperture formed in the body portion, wherein the first passageway defines the first flow path between the first aperture and the second aperture, and wherein the second passageway defines the second flow path between the first aperture and the second aperture.

4. The internal combustion engine of claim 3, wherein the first passageway and the second passageway are defined by the body portion of the crankcase pressure regulator.

5. The internal combustion engine of claim 1, further comprising, a crankcase breather line that extends between the crankcase and the crankcase pressure regulator to provide fluid communication between the crankcase and the crankcase pressure regulator.

6. The internal combustion engine of claim 1, wherein the crankcase pressure regulator further includes, a first aperture formed in the body portion, and a second aperture formed in the body portion, wherein the first passageway defines the first flow path between the first aperture and the second aperture, and wherein the second passageway defines the second flow path between the first aperture and the second aperture, the engine further comprising, a first connector received within the first aperture, the first connector fluidly coupling the first portion of the crankcase breather line to the crankcase pressure regulator; and a second connector received within the second aperture, the second connector fluidly coupling the second portion of the crankcase breather line to the crankcase pressure regulator.

7. The internal combustion engine of claim 1, further comprising, a turbo charger having an inlet, the turbo charger operable to compress engine combustion air; and a vent line that provides fluid communication between the oil tank and the inlet of the turbo charger.

8. The internal combustion engine of claim 1, wherein the first valve includes a valve member and the biasing member of the first valve biases the valve member into the closed position, wherein the second valve includes a valve member and the biasing member of the second valve biases the valve member of the second valve into the closed position.

9. The internal combustion engine of claim 8, wherein the valve member of the first valve includes a ball and the biasing member of the first valve includes a coil spring, and wherein the valve member of the second valve includes a ball and the biasing member of the second valve includes a coil spring.

10. The internal combustion engine of claim 9, wherein the first valve further includes a valve seat integrally formed with the body of the pressure regulator as a single component and the ball of the first valve is biased toward the valve seat, and wherein the second valve further includes a valve seat integrally formed with the body of the pressure regulator as a single component, and the ball of the second valve is biased toward the valve seat of the second valve.

11. The internal combustion engine of claim 8, wherein the difference between the crankcase pressure and the ambient pressure forces the valve member of the first valve against the bias of the biasing member of the first valve to hold the first valve in the open position, and wherein the difference between the crankcase pressure and the ambient pressure forces the valve member of the second valve against the bias of the biasing member of the second valve to hold the second valve in the open position.

12. The internal combustion engine of claim 1, wherein the first predetermined pressure is about negative six pounds per square inch relative to the ambient pressure, and wherein the second predetermine pressure is greater than about zero pounds per square inch relative to the ambient pressure.

13. The internal combustion engine of claim 1, wherein the internal combustion engine is a two-stoke diesel engine.

14. A two-stroke diesel engine comprising:

a crankcase having a crankcase pressure defined as a pressure within the crankcase relative to an ambient pressure, the crankcase pressure varying in response to operation of the engine;

a crankcase pressure regulator in fluid communication with the crankcase, the crankcase pressure regulator including, a first valve movable from an open position to a closed position, and a second valve movable from an open position to a closed position;

an oil sump pump in fluid communication with the crankcase, the oil sump pump operable to remove oil and air from the crankcase to reduce the crankcase pressure;

an oil tank;

a scavenge discharge line that provides fluid communication between the crankcase, the oil sump pump, and the oil tank;

a crankcase breather line including a first portion that extents between the crankcase pressure regulator and the crankcase to provide fluid communication between the crankcase and the crankcase pressure regulator, and a second portion that extends between the crankcase pressure regulator and the oil tank to provide fluid communication between the crankcase pressure regulator and the oil tank;

an oil supply pump operable to supply oil from the oil tank to the crankcase;

a turbo charger having an inlet, the turbo charger operable to compress engine combustion air; and a vent line that provides fluid communication between the oil tank and the inlet of the turbo charger, wherein when the crankcase pressure is less than a first predetermined pressure, the first valve is held in the open position by the ambient pressure to allow a fluid flow into the crankcase to increase the crankcase pressure while the second valve is held in the closed position, wherein when the crankcase pressure is greater than a second predetermined pressure, the second valve is held in the open position by the crankcase pressure to allow a fluid flow out of the crankcase to reduce the crankcase pressure while the first valve is held in the closed position, and wherein the second predetermined pressure is greater than the first predetermined pressure.

15. The two-stroke diesel engine of claim 14, wherein the first valve includes a valve member and a biasing member that biases the valve member toward the closed position, and wherein the biasing member of the first valve retains the valve member of the first valve in the closed position when the crankcase pressure is greater than the first predetermined pressure, and wherein the second valve includes a valve member and a biasing member that biases the valve member of the second valve toward the closed position, and wherein the biasing member of the second valve retains the valve member of the second valve in the closed position when the crankcase pressure is less than the second predetermined pressure.

16. The two-stroke diesel engine of claim 14, wherein the crankcase pressure regulator further includes, a first aperture, a second aperture, a first passageway defining a first flow path between the first aperture and the second aperture, a second passageway defining a second flow path between the first aperture and the second aperture that is in a parallel arrangement to the first passageway, wherein the first valve is located within the first passageway, and wherein the second valve is located within the second passageway.

17. The two-stroke diesel engine of claim 14, the first valve is a check valve biased toward the closed position, the first valve generally preventing fluid flow out of the crankcase, and wherein the second valve is a check valve biased toward the closed position generally preventing fluid flow into the crankcase.

* * * * *